United States Patent
Olgren et al.

[11] Patent Number: 6,036,228
[45] Date of Patent: Mar. 14, 2000

[54] ADJUSTABLE STEERING COLUMN FOR MOTOR VEHICLE

[75] Inventors: Leland Nels Olgren, Frankenmuth; Melvin Lee Tinnin, Clio; Indulis H. Piziks, Hemlock, all of Mich.

[73] Assignee: General Motors Corporation, Detroit, Mich.

[21] Appl. No.: 09/072,235

[22] Filed: May 4, 1998

[51] Int. Cl.[7] .................................................. B62D 1/18
[52] U.S. Cl. ........................................ 280/775; 74/493
[58] Field of Search ............................ 280/775, 779; 74/493

[56] References Cited

U.S. PATENT DOCUMENTS

| | | | |
|---|---|---|---|
| 4,463,626 | 8/1984 | Kazaoka et al. | 74/493 |
| 4,507,982 | 4/1985 | Turner et al. | 74/493 |
| 4,593,577 | 6/1986 | Kinoshita | 74/493 |
| 4,819,498 | 4/1989 | Nishikawa et al. | 74/493 |
| 4,958,852 | 9/1990 | Kohno et al. | 280/775 |
| 5,022,282 | 6/1991 | Nishikawa | 74/493 |
| 5,027,674 | 7/1991 | Nolte et al. | 74/493 |
| 5,029,489 | 7/1991 | Burmeister et al. | 74/493 |
| 5,524,927 | 6/1996 | Toussaint | 280/777 |

*Primary Examiner*—Paul N. Dickson
*Assistant Examiner*—Faye M. Fleming
*Attorney, Agent, or Firm*—Edmund P Anderson

[57] ABSTRACT

A steering column including a mast jacket pivotable up and down for vertical adjustment and variable lengthwise for horizontal adjustment and a clamp for releasably capturing the position of the steering column. The clamp includes a stationary bracket, a first rack lever and a second rack lever each pivotally supported on the stationary bracket and linked to the mast jacket by a drive lug, and a pair of lock shoes supported on the stationary bracket for linear translation and pivotal movement. An intermediate link between the lock shoes and a manual control lever thrusts the lock shoes linearly toward a cam on the stationary bracket concurrent with pivotal movement of the control lever toward a locked position. The cam pivots the lock shoes concurrent with linear translation to wedge the lock shoes against respective ones of the rack levers with toothed racks on the rack shoes meshing with toothed racks on the rack levers to capture the position of the mast jacket by immobilizing the rack levers. Resilient thrust on the intermediate link in an over-center position thereof relative to the control lever retains the control lever in its locked position.

10 Claims, 3 Drawing Sheets

6,036,228

1

ADJUSTABLE STEERING COLUMN FOR MOTOR VEHICLE

TECHNICAL FIELD

This invention relates to adjustable steering columns for motor vehicles.

BACKGROUND OF THE INVENTION

A typical motor vehicle steering column includes a tubular mast jacket, a steering shaft supported on the mast jacket for rotation about a longitudinal centerline of the steering column, and a steering hand wheel attached to the steering shaft at the top of the steering column. The mast jacket may be pivotable up and down on a body of the motor vehicle to adjust the vertical position of the steering hand wheel and/or the length of the mast jacket may be variable to adjust the horizontal position of the steering hand wheel. Such adjustable steering columns typically include a clamp by which a stationary bracket and the mast jacket are squeezed together to capture by friction the position of the mast jacket. To enhance the friction couple between the mast jacket and the stationary bracket, it is known to form teeth on the stationary bracket and on the mast jacket which mesh when the clamp closes and which unmesh when the clamp opens. A motor vehicle steering column according to this invention is a novel alternative to the aforesaid adjustable steering columns having friction clamps and enhanced friction clamps.

SUMMARY OF THE INVENTION

This invention is a new and improved steering column for a motor vehicle including a mast jacket pivotable up and down for vertical adjustment of the steering column and variable lengthwise for horizontal adjustment of the steering column. A clamp for releasably capturing the position of the steering column includes a stationary bracket, a first rack lever and a second rack lever each pivotally supported on the stationary bracket and linked to the mast jacket by a drive lug, and a pair of lock shoes supported on the stationary bracket for linear translation and pivotal movement. An intermediate link between the lock shoes and a manual control lever thrusts the lock shoes linearly toward a cam on the stationary bracket concurrent with pivotal movement of the control lever toward a locked position. The cam pivots the lock shoes concurrent with linear translation to wedge the lock shoes against respective ones of the rack levers with toothed racks on the rack shoes meshing with toothed racks on the rack levers to capture the position of the mast jacket by immobilizing the rack levers. Resilient thrust on the intermediate link in an over-center position thereof relative to the control lever retains the control lever in its locked position.

DESCRIPTION OF THE PREFERRED EMBODIMENT

Figure 1:
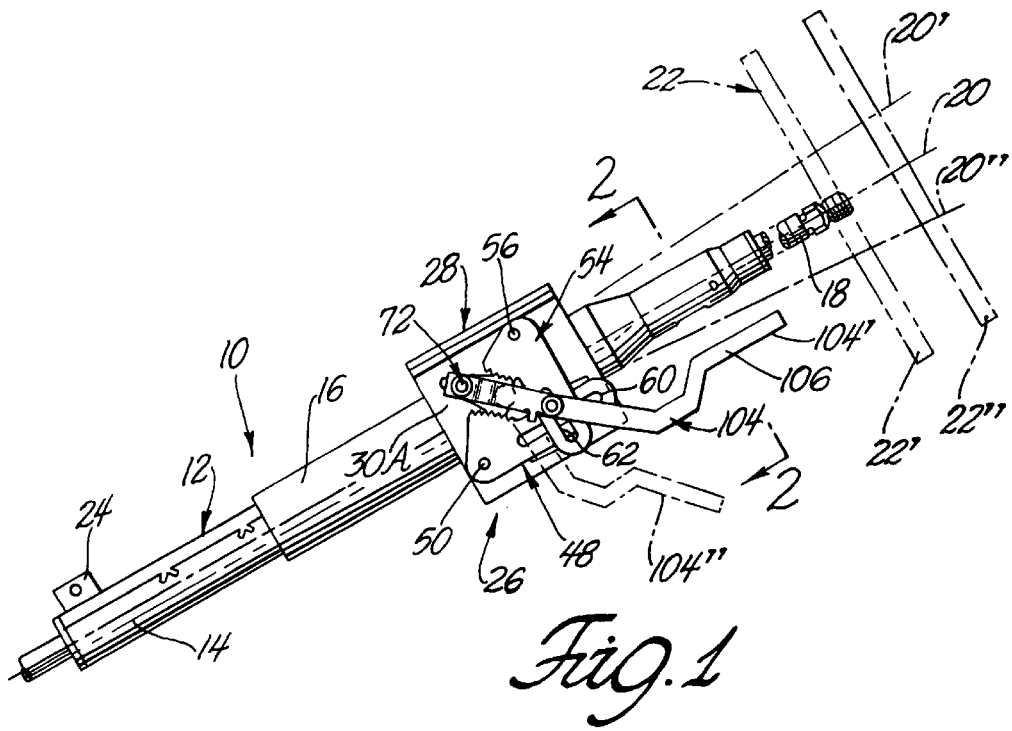
FIG. 1 is a fragmentary elevational view of a motor vehicle steering column according to this invention.
Figure 2:
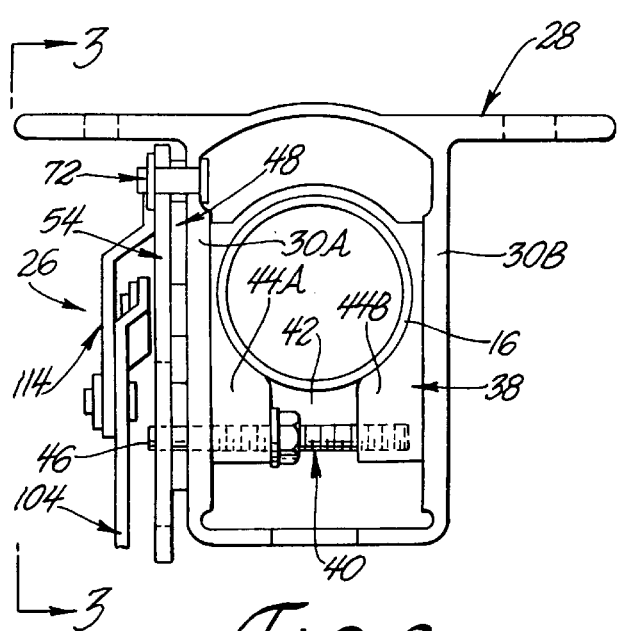
FIG. 2 is an enlarged sectional view taken generally along the plane indicated by lines 2—2 in FIG. 1.
Figure 4:
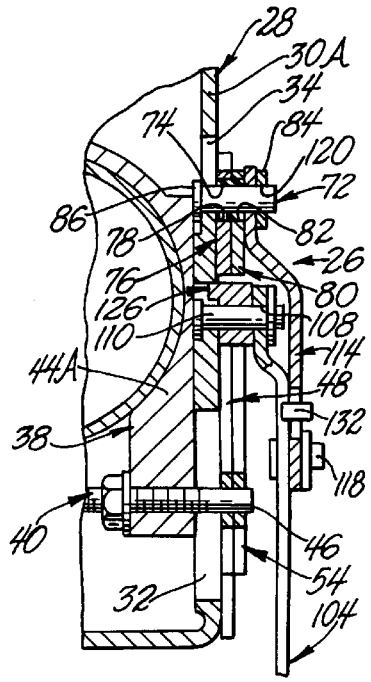
FIG. 4 is a sectional view taken generally along the plane indicated by lines 4—4 in FIG. 3.
Figure 3:
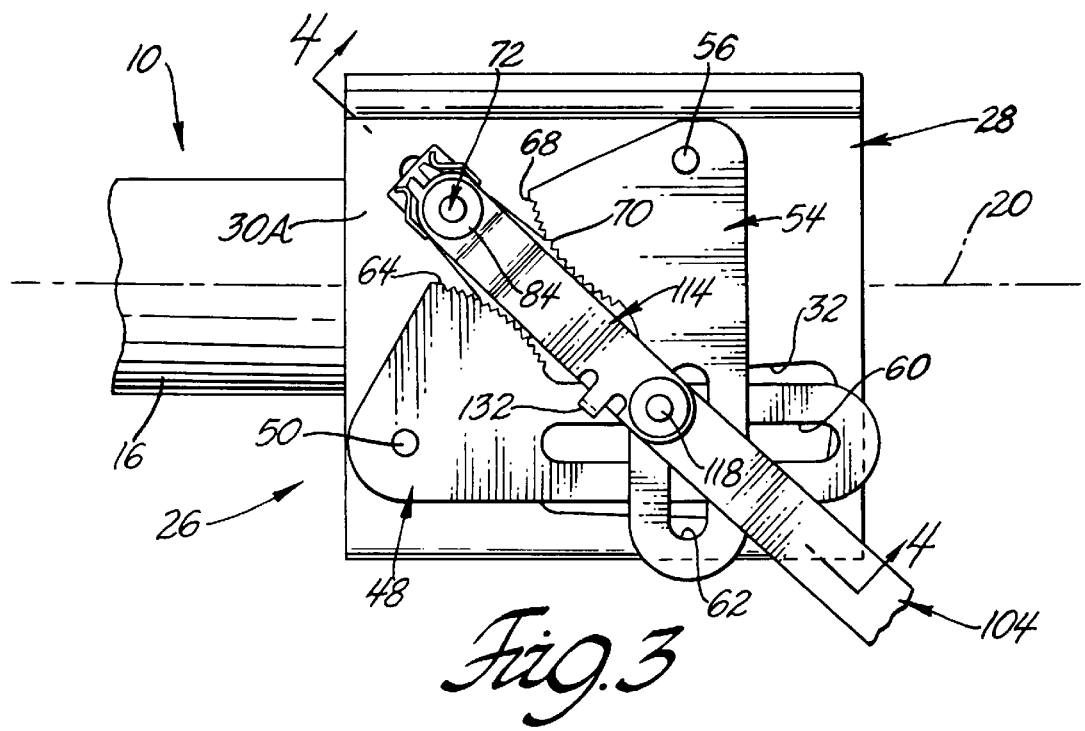
FIG. 3 is a sectional view taken generally along the plane indicated by lines 3—3 in FIG. 2.

Referring to FIGS. 1–3, a steering column 10 according to this invention has a schematically represented tubular mast jacket assembly 12 including a lower mast jacket 14 and an upper mast jacket 16 telescopically overlapping the lower mast jacket. A steering shaft 18 is supported on the mast jacket assembly for rotation about a longitudinal centerline 20 of the steering column. A steering hand wheel 22 is rigidly attached to the steering shaft 18 at the top of the steering column. The mast jacket assembly 12 is connected to a body, not shown, of a motor vehicle at pivot bracket 24 on the lower mast jacket 14. The steering column 10 is adjustable vertically by up and down pivotal movement of the mast jacket assembly between an upper limit position 20' and a lower limit position 20". The mast jacket assembly 12 is variable lengthwise for horizontal adjustment of the steering column by linear translation of the upper mast jacket 16 relative to the lower mast jacket 14 in the direction of the longitudinal centerline 20 between an inner limit position 22' and an outer limit position 22".

A clamp 26 on the steering column 10 includes a box-shaped stationary bracket 28 rigidly attached to the body of the motor vehicle having a pair of vertical sides 30A,30B on opposite sides of the upper mast jacket 16. The vertical side 30A of the stationary bracket is perforated by a large window 32 and by a slot 34 having a longitudinal centerline 36 in the plane of the vertical side 30A. A split collar 38 is rigidly clamped to the upper mast jacket 16 between the vertical sides 30A,30B of the stationary bracket by a turnbuckle stud 40 spanning a slot 42 in the collar. The collar has a pair of vertical sides 44A,44B facing the vertical sides 30A,30B of the stationary bracket and cooperating therewith in confining the mast jacket assembly in a longitudinal vertical plane of the body of the motor vehicle during vertical and horizontal adjustment of the steering column. A distal end of the turnbuckle stud 40 traverses the vertical side 30A of the stationary bracket through the window 32 and defines a rigid drive lug 46 on the upper mast jacket 16.

A flat first rack lever 48 of the clamp 26 is supported on a pin 50 on the vertical side 30A of the stationary bracket for pivotal movement about a first lateral centerline 52 of the clamp on one side of the longitudinal centerline 36 of the slot 34. A flat second rack lever 54 of the clamp 26 overlaps the first rack lever and is supported on a pin 56 on the vertical side 30A of the stationary bracket for pivotal movement about a second lateral centerline 58 of the clamp on the opposite side of the longitudinal centerline 36 of the slot 34 from the first lateral centerline.

The first rack lever 48 has an elongated slot 60 closely fitted over the drive lug 46. The second rack lever 54 has an elongated slot 62 closely fitted over the drive lug 46. The elongated slots 60,62 cooperate with the drive lug 46 in converting vertical and horizontal adjustment of the steering column 10 into concurrent pivotal movement of the first and the second rack levers 48,54. The first rack lever 48 has a curved edge 64 interrupted by a toothed rack 66. The second rack lever 54 has a curved edge 68 interrupted by a toothed rack 70.

A pivot stud 72 is disposed in the slot 34 in the vertical side 30A of the stationary bracket. A tubular elastomeric bushing 74 is fitted closely on the pivot stud outboard of the vertical side 30A. A substantially flat first lock shoe 76 has an aperture 78 therein closely fitted around the bushing 74 and cooperating therewith in supporting the first lock shoe on the stationary bracket 28 juxtaposed the vertical side 30A thereof for pivotal movement in the plane of the first rack lever 48. A substantially flat second lock shoe 80 has an aperture 82 therein closely fitted around the bushing 74 and cooperating therewith in supporting the second lock shoe on the stationary bracket juxtaposed the first lock shoe for pivotal movement in the plane of the second rack lever 54. A retainer 84 on the pivot stud outboard of the second lock shoe cooperates with an enlarged head 86 on the pivot stud inboard of the vertical side 30A of the stationary bracket in preventing dislodgment of the first and second lock shoes from the pivot stud and in maintaining the pivot stud perpendicular to the vertical side 30A during back and forth linear translation of the pivot stud in the slot 34.

Figure 7:
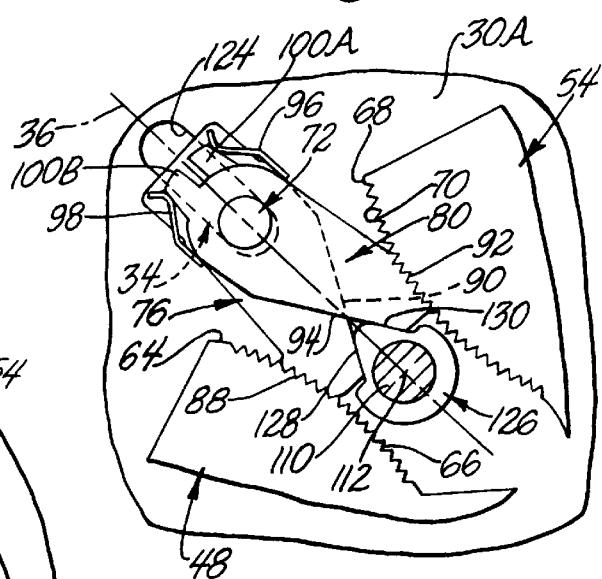
FIG. 7 is an enlarged sectional view taken generally along the plane indicated by lines 7—7 in FIG. 6.
Figure 8:
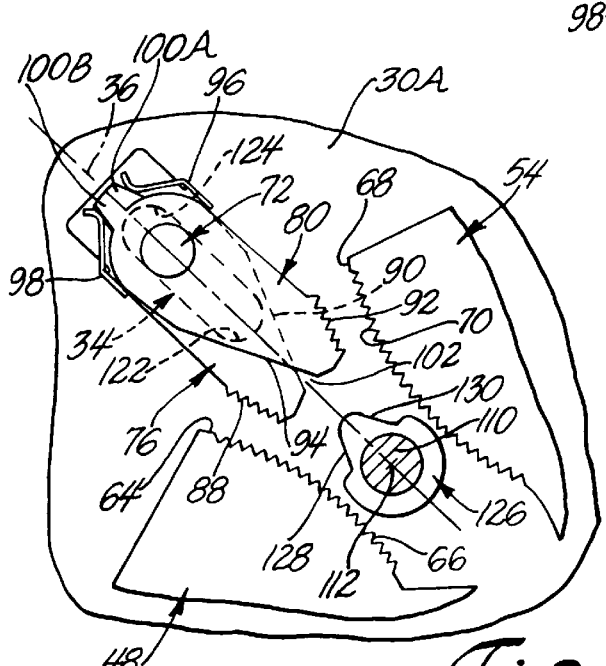
FIG. 8 is similar to FIG. 7 showing structural elements of the clamp of the motor vehicle steering column according to this invention in different relative positions.

As seen best in FIGS. 7–8, the first lock shoe 76 has a toothed rack 88 facing the toothed rack 66 on the first rack lever 48 and a ramp edge 90 behind the toothed rack 88. The second lock shoe 80 has a toothed rack 92 facing the toothed rack 70 on the second rack lever 54 and a ramp edge 94 behind the toothed rack 92. A spring bracket on the pivot stud has a first spring leaf 96 bearing against and biasing the first lock shoe 76 counterclockwise, FIGS. 7–8, and a second spring leaf 98 bearing against and biasing the second lock shoe 80 clockwise. The spring leafs 96,98 resiliently bias together respective ones of a pair of tangs 100A, 100B on the first and the second lock shoes. When the tangs 100A,100B are resiliently biased together, the ramp edges 90,94 on the first and the second lock shoes define a V-shaped notch 102 between the lock shoes.

As seen best in FIGS. 1–6, a manual control lever 104 of the clamp 26 has a finger grip 106 at one end and an aperture 108 at the other end closely fitted on a rigid pin 110 on the vertical side 30A of the stationary bracket 28. The centerline 36 of the slot 34 in the vertical leg 30A intersects the rigid pin 110.

The aperture 108 cooperates with the pin 110 in supporting the control lever on the stationary bracket for pivotal movement about a third lateral centerline 112 of the clamp between a locked position 104' and an unlocked position 104", FIG. 1.

An intermediate link 114 has a first aperture 116 at one end closely fitted on pin 118 rigidly attached to the control lever 104 between the finger grip 106 and aperture 108 for pivotal movement relative to the control lever. A second aperture 120 in the intermediate link 114 is closely fitted on the pivot stud 72 between the retainer 84 and the bushing 74 for pivotal movement relative to the pivot stud. The intermediate link 114 induces linear translation of the pivot stud 72 between a first end 122 and a second end 124 of the slot 34 in response to pivotal movement of the control lever between its locked and unlocked positions 104',104".

A cam 126 on the pin 110 between the manual control lever 104 and the vertical side 30A of the stationary bracket is rigid relative to the stationary bracket and spans the planes of the first and the second lock shoes 76,80. The cam 126 has a first shoulder 128 defining a wedge with respect to the curved edge 64 of the first rack lever. The cam 126 has a second shoulder 130 defining a wedge with respect to the curved edge 68 of the second rack lever. The first shoulder 128 intercepts the ramp edge 90 on the first lock shoe 76 behind the toothed rack 88 when the pivot stud 72 is thrust toward the first end 122 of the slot 34 by the intermediate link 114. The second shoulder 130 intercepts the ramp edge 94 on the second lock shoe 80 behind the toothed rack 92 when the pivot stud is thrust toward the first end of the slot 34 by the intermediate link 72.

Figure 5:
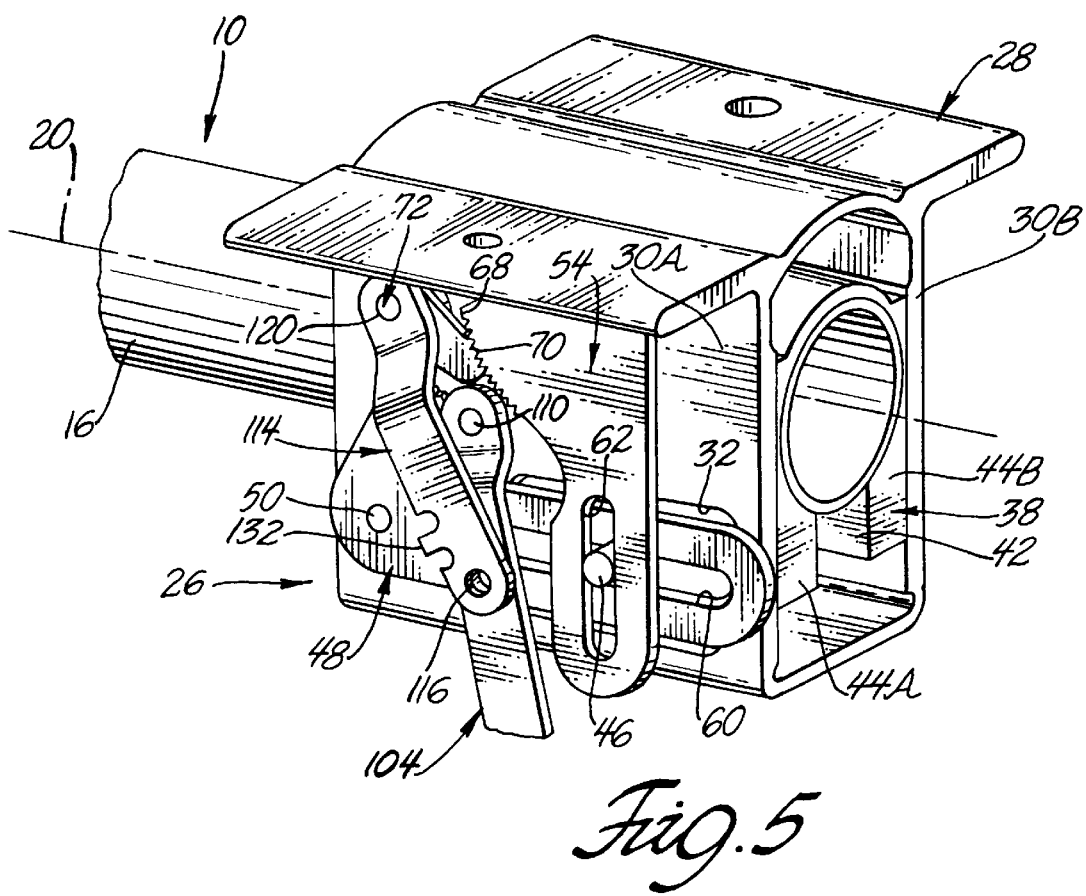
FIG. 5 is a perspective view of a clamp of the motor vehicle steering column according to this invention.
Figure 6:
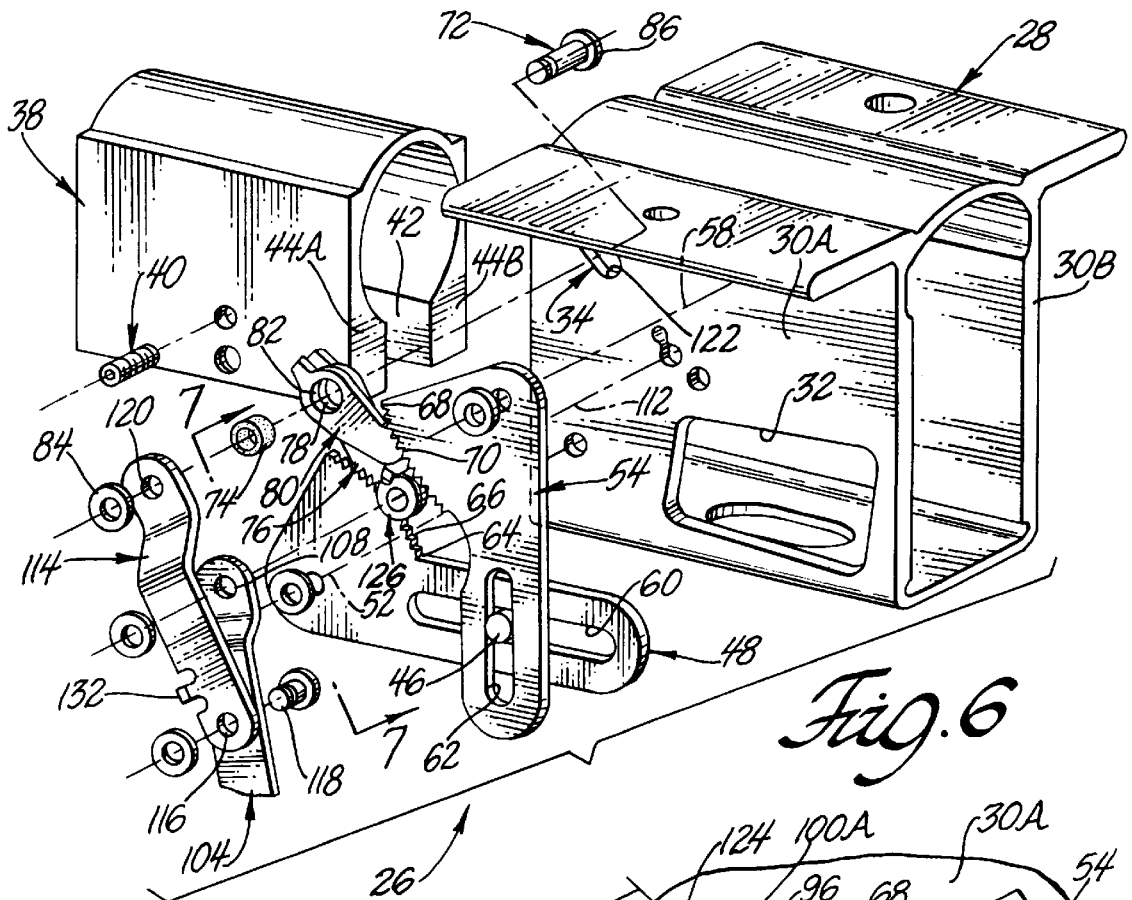
FIG. 6 is an exploded perspective view of the clamp of the motor vehicle steering column according to this invention.

In the unlocked position 104" of the manual control lever 104, FIGS. 1,5 and 8, the pivot stud 72 is at the second end 124 of the slot 34 in the vertical side 30A of the stationary bracket and the first and the second lock shoes 76,80 are remote from the rack levers 48,54. The spring leafs 96,98 resiliently bias the tangs 100A, 100B on the lock shoes together and the V-shaped notch 102 defined between the lock shoes faces the end of the cam 126 between the shoulders 128,130 thereof. The steering column is adjusted vertically and horizontally by force applied by an operator to the upper mast jacket during which adjustment the collar 38 on the upper mast jacket translates up and down and back and forth between the vertical sides 30A,30B of the stationary bracket. At the same time, the drive lug 46 pivots each of the first and the second rack levers about corresponding ones of the first and the second lateral centerlines 52,58 of the clamp. When vertical and horizontal adjustment of the steering column yields a comfortable position of the steering hand wheel 22, the operator grasps the finger tab 106 and pivots the control lever 104 counterclockwise, FIGS. 1,3,5 and 6, from its unlocked position 104" toward its locked position 104'.

The intermediate link 114 converts pivotal movement of the control lever 104 toward its locked position 104' into linear translation of the pivot stud 72 toward the first end 122 of the slot 34. The end of the cam 126 between the shoulders 128,130 penetrates the V-shaped notch 102 defined between the lock shoes when the pivot stud is about in the middle of the slot 34. Thereafter, with continued linear translation of the pivot stud, the shoulder 128 on the cam cooperates with the ramp edge 90 in commencing to pivot the first lock shoe 76 on the pivot stud toward the curved edge 64 of the first rack lever. Likewise, the shoulder 130 on the cam cooperates with the ramp edge 94 in commencing to pivot the second lock shoe 80 on the pivot stud toward the curved edge 68 of the second rack lever.

Through the combination of linear translation induced by the pivot stud 72 and pivotal movement induced by the cam 126, the first lock shoe 76 is thrust to a wedged position, FIG. 7, between the shoulder 128 on the cam and the curved edge 64 of the first rack lever with the toothed racks 88,66 firmly in mesh. Likewise, the second lock shoe 80 is thrust to a wedged position, FIG. 7, between the shoulder 130 on the cam and the curved edge 68 of the second rack lever with the toothed racks 92,70 firmly in mesh. The meshed pairs of toothed racks 88,66 and 92,70 rigidly immobilize the first and the second rack levers 48,54 which, in turn, rigidly immobilize the drive lug 46 on the collar 38 on the upper mast jacket thereby to capture coincidentally the vertical and the horizontal adjusted positions of the steering column relative to the stationary bracket 28. Importantly, the combination of linear translation and pivotal movement of each of the first and the second lock shoes minimizes the likelihood of peak-to-peak interference between the toothed racks 88,66 and 92,70 as the lock shoes approach their wedged positions.

The first and the second lock shoes 76,80 attain their wedged positions with the toothed racks 88,66 and 92,70 firmly in mesh before the locked position 104' of the manual control lever is attained. With linear translation of the pivot stud 72 toward the first end 122 of the slot 34 blocked by the first and the second lock shoes in their wedged positions, continued pivotal movement of the manual control lever causes the elastomeric bushing 74 to become resiliently compressed between the lock shoes and the pivot stud. The corresponding spring force attributable to the elastomeric bushing is transferred to the manual control lever 104 through the intermediate link 114 and resists counterclockwise pivotal movement of the manual control lever toward its locked position as long as the pin 118 on the control lever remains below the centerline 36 of the slot 34. When the pin crosses the centerline 36, the intermediate link 114 goes "over-center" and biases the manual control lever toward and maintains the control lever in its locked position 104' defined by engagement of a turned-down tab 132 on the intermediate link against an edge of the control lever, FIG. 3.

To release the mast jacket assembly 12 for vertical and horizontal adjustment of the steering column 10, the manual control lever 104 is pivoted clockwise, FIG. 3, from its locked position 104' to its unlocked position 104". The pin 118 on the control lever traverses the centerline 36 of the slot 34 and the intermediate link 114 thrusts the pivot stud 72 back toward the second end 124 of the slot 34 thereby to separate the toothed racks 88,66 and 92,70 and release the first and the second rack levers 48,54 for unobstructed pivotal movement. At the same time, the spring leafs 96,98 pivot the first and the second lock shoes on the pivot stud 72 until the tangs 100A, 100B are thrust together and the V-shaped notch 102 defined between the lock shoes faces the cam 126 in preparation for the next succeeding operational cycle of the clamp 26.

Having thus described the invention, what is claimed is:

1. A steering column for a motor vehicle including a mast jacket assembly supported on a body of said motor vehicle for adjustment in one of a vertical direction of adjustment and a horizontal direction of adjustment, and a clamp for capturing a selected adjusted position of said mast jacket, characterized in that said clamp comprises:

a stationary bracket on said body of said motor vehicle, a rack lever supported on said stationary bracket for pivotal movement about a first lateral centerline of said stationary bracket, a toothed rack on an edge of said rack lever, a drive means operative to positively pivot said rack lever concurrent with adjustment of said mast jacket assembly in said one of said vertical and said horizontal directions of adjustment, a pivot stud supported on said stationary bracket for back and forth liner translation in a plane perpendicular to said first lateral centerline in the direction of a longitudinal centerline, a lock shoe supported on said pivot stud for pivotal movement relative to said pivot stud and for linear translation as a unit with said pivot stud, a toothed rack on said lock shoe facing said toothed rack on said rack lever, a manual control lever supported on said stationary bracket for pivotal movement between a locked position and an unlocked position about a second lateral centerline of said clamp intersecting said longitudinal centerline, a link means responsive to pivotal movement of said manual control lever from said unlocked position to said locked position to thrust said pivot stud linearly in the direction of said longitudinal centerline toward said second lateral centerline, and a cam means on said stationary bracket operative in response to linear translation of said pivot stud toward said second lateral centerline to guide said lock shoe to a wedged position between said cam means and said rack lever with said toothed rack on said lock shoe meshing with said toothed rack on said rack lever to capture the position of said mast jacket assembly by preventing pivotal movement of said rack lever.

2. The steering column for a motor vehicle recited in claim 1 wherein said drive means comprises:

an elongated slot in said rack lever, and a drive lug rigidly attached to said mast jacket assembly and closely fitted in said elongated slot in said rack lever.

3. The steering column for a motor vehicle recited in claim 2 wherein said link means comprises:

an intermediate link pivotally connected at a first end thereof to said pivot stud and pivotally connected at a second end thereof to said manual control lever on the opposite side of said second lateral centerline from said pivot stud.

4. The steering column for a motor vehicle recited in claim 3 wherein said cam means comprises:

a cam rigidly attached to said stationary bracket on said longitudinal centerline having a shoulder defining a wedge with respect to said toothed rack on said edge of said rack lever and engageable on an edge of said lock shoe behind said toothed rack thereon during linear translation of said pivot stud toward said second lateral centerline.

5. The steering column for a motor vehicle recited in claim 4 further comprising:

an elastomeric bushing resiliently compressed between said lock shoe and said pivot stud in said wedged position of said lock shoe and said locked position of said manual operating lever, said intermediate link being in an over-center position relative to said longitudinal centerline in said locked position of said manual operating lever so that a spring force attributable to the compression of said elastomeric bushing is transferred to said manual control lever through said intermediate link and biases said manual control lever to said locked position thereof.

6. A steering column for a motor vehicle including a mast jacket assembly supported on a body of said motor vehicle for adjustment in a vertical direction of adjustment and in a horizontal direction of adjustment, and a clamp for capturing coincidentally a vertical adjusted position of said mast jacket and a horizontal adjusted position of said mast jacket, characterized in that said clamp comprises:

a stationary bracket on said body of said motor vehicle, a first rack lever supported on said stationary bracket for pivotal movement about a first lateral centerline of said stationary bracket, a second rack lever supported on said stationary bracket for pivotal movement about a second lateral centerline of said stationary bracket, a toothed rack on an edge of said first rack lever, a toothed rack on an edge of said second rack lever, a drive means operative to positively pivot said first rack lever concurrent with adjustment of said mast jacket assembly in said vertical direction of adjustment and said second rack lever concurrent with adjustment of said mast jacket assembly in said horizontal direction of adjustment, a pivot stud supported on said stationary bracket for back and forth liner translation in a plane perpendicular to said first and said second lateral centerlines in the direction of a longitudinal centerline between said first and said second lateral centerlines, a first lock shoe supported on said pivot stud for pivotal movement relative to said pivot stud and for linear translation as a unit with said pivot stud, a toothed rack on said first lock shoe facing said toothed rack on said first rack lever, a second lock shoe supported on said pivot stud for pivotal movement relative to said pivot stud and for linear translation as a unit with said pivot stud, a toothed rack on said second lock shoe facing said toothed rack on said second rack lever, a manual control lever supported on said stationary bracket for pivotal movement between a locked position and an unlocked position about a third lateral centerline of said clamp intersecting said longitudinal centerline, a link means responsive to pivotal movement of said manual control lever from said unlocked position to said locked position to thrust said pivot stud linearly in the direction of said longitudinal centerline toward said third lateral centerline, and a cam means on said stationary bracket operative in response to linear translation of said lock shoe toward said third lateral centerline to guide said first lock shoe to a wedged position between said cam means and said first rack lever with said toothed rack on said first lock shoe meshing with said toothed rack on said first rack lever and to guide said second lock shoe to a wedged position between said cam means and said second rack lever with said toothed rack on said second lock shoe meshing with said toothed rack on said second rack lever.

7. The steering column for a motor vehicle recited in claim 6 wherein said drive means comprises:

an elongated slot in said first rack lever, an elongated slot in said second rack lever, and a drive lug rigidly attached to said mast jacket assembly and closely fitted in said elongated slot in said first rack lever and in said elongated slot in said second rack lever.

8. The steering column for a motor vehicle recited in claim 7 wherein said link means comprises:

an intermediate link pivotally connected at a first end thereof to said pivot stud and pivotally connected at a second end thereof to said manual control lever on the opposite side of said third lateral centerline from said pivot stud.

9. The steering column for a motor vehicle recited in claim 8 wherein said cam means comprises:

a cam rigidly attached to said stationary bracket on said longitudinal centerline, a first shoulder on said cam defining a wedge with respect to said toothed rack on said edge of said first rack lever and engageable on an edge of said first lock shoe behind said toothed rack thereon during linear translation of said pivot stud toward said third lateral centerline, and a second shoulder on said cam defining a wedge with respect to said toothed rack on said edge of said second rack lever and engageable on an edge of said second lock shoe behind said toothed rack thereon during linear translation of said pivot stud toward said third lateral centerline.

10. The steering column for a motor vehicle recited in claim 9 further comprising:

an elastomeric bushing resiliently compressed between said pivot stud and each of said first lock shoe and said second lock shoe in said wedged positions of said first and said second lock shoes and said locked position of said manual operating lever, said intermediate link being in an over-center position relative to said longitudinal centerline in said locked position of said manual operating lever so that a spring force attributable to the compression of said elastomeric bushing is transferred to said manual control lever through said intermediate link and biases said manual control lever to said locked position thereof.

* * * * *